(12) United States Patent
Weisz

(10) Patent No.: US 8,051,660 B2
(45) Date of Patent: Nov. 8, 2011

(54) CHARGING DEVICE

(75) Inventor: Rafael Weisz, Waiblingen (DE)

(73) Assignee: Mahle International GmbH (DE)

( * ) Notice: Subject to any disclaimer, the term of this patent is extended or adjusted under 35 U.S.C. 154(b) by 307 days.

(21) Appl. No.: 12/338,434

(22) Filed: Dec. 18, 2008

(65) Prior Publication Data

US 2009/0158732 A1    Jun. 25, 2009

(30) Foreign Application Priority Data

Dec. 21, 2007   (DE) .......................... 10 2007 062 223

(51) Int. Cl.
*F02B 33/44* (2006.01)
*F04B 17/00* (2006.01)
*F04B 35/00* (2006.01)
*F01D 15/12* (2006.01)
*B01D 35/00* (2006.01)
*B01D 27/10* (2006.01)
*B01D 35/14* (2006.01)
*B01D 41/00* (2006.01)

(52) U.S. Cl. .................... 60/605.3; 417/407; 415/122.1; 210/90; 210/130; 210/131; 210/132

(58) Field of Classification Search ............ 60/597–612, 60/605.3; 184/6.24, 6.26, 6.9, 6.11; 210/130–132, 210/167.05, 167.03, 510.1, 90, 404, 347, 210/408; 415/122.1; 384/123–124, 305; 417/407; *B01D 35/147, 35/14*

See application file for complete search history.

(56) References Cited

U.S. PATENT DOCUMENTS

| 2,103,572 | A | * | 12/1937 | Wells | ............................ | 210/347 |
| 2,259,235 | A | * | 10/1941 | Weiss | ............................ | 210/404 |
| 2,770,368 | A | * | 11/1956 | Tischer | ......................... | 210/132 |
| 2,828,907 | A | * | 4/1958 | Oehrli | ......................... | 415/122.1 |

(Continued)

FOREIGN PATENT DOCUMENTS

CA      2538286      3/2006

(Continued)

OTHER PUBLICATIONS

English abstract for DE-102004041290, published on Aug. 25, 2004.

*Primary Examiner* — Thai Ba Trieu
(74) *Attorney, Agent, or Firm* — Rader, Fishman & Grauer PLLC

(57) ABSTRACT

The present invention relates to a charging device (1), in particular an exhaust-gas turbo charger for a motor vehicle, comprising a shaft (3) which is supported in a housing (2), and which carries a turbine wheel (6) on the turbine side, and a compressor wheel (8) on the compressor side, wherein the shaft (3) is supported by means of at least one bearing device (9) in the housing (2), wherein a lubricant supply channel (10) is provided through which the bearing device (9) is supplied with lubricant, wherein in the lubricant supply channel (10), a filter device (11) with at least one filter element (12) is arranged. For this, it is essential for the invention that the filter element (12) is pretensioned by means of a spring device (13) against a seal seat (14), wherein the spring device (13) and the filter element (12) is formed in a manner that at exceeding of a predefined lubricant threshold pressure, the filter element (12) disengages from the seal seat (14), and releases a bypass (15) which bypasses the filter element (12).

19 Claims, 2 Drawing Sheets

U.S. PATENT DOCUMENTS

| | | | |
|---|---|---|---|
| 3,090,544 | A * | 5/1963 | Woollenweber, Jr. et al. .......................... 184/6.16 |
| 3,235,085 | A * | 2/1966 | Humbert, Jr. ................ 210/130 |
| 3,368,679 | A * | 2/1968 | Bozek ........................ 210/90 |
| 3,490,593 | A * | 1/1970 | Pohoski ...................... 210/130 |
| 3,526,590 | A * | 9/1970 | Russo ........................ 210/439 |
| 3,598,237 | A * | 8/1971 | Aspinwall et al. ........... 210/130 |
| 3,727,761 | A * | 4/1973 | Aspinwall et al. ........... 210/130 |
| 3,805,921 | A | 4/1974 | Marion |
| 3,984,044 | A * | 10/1976 | Breton et al. ............. 210/510.1 |
| 4,426,965 | A * | 1/1984 | Patel ...................... 123/196 AB |
| 4,503,679 | A * | 3/1985 | Saito et al. ................ 60/605.3 |
| 5,187,935 | A * | 2/1993 | Akiyama et al. ............. 60/602 |
| 5,253,985 | A * | 10/1993 | Ruetz ........................ 417/407 |
| 5,665,232 | A * | 9/1997 | Schlegel .................... 210/510.1 |
| 5,972,210 | A * | 10/1999 | Munkel ...................... 210/90 |
| 6,024,495 | A * | 2/2000 | Loos et al. .................. 384/123 |
| 6,177,010 | B1 | 1/2001 | Schamel et al. |
| 6,613,221 | B2 * | 9/2003 | Golovatai-Schmidt et al. .......................... 210/131 |
| 6,818,122 | B2 * | 11/2004 | Mouhebaty .................. 210/132 |
| 6,883,321 | B2 * | 4/2005 | Fornof ...................... 60/605.2 |
| 7,040,874 | B1 * | 5/2006 | Martin et al. ................ 417/407 |
| 7,329,342 | B2 * | 2/2008 | Faria ...................... 210/167.05 |
| 7,343,740 | B2 * | 3/2008 | Sakai et al. ................. 60/453 |
| 7,530,228 | B2 * | 5/2009 | Martin et al. ............... 60/605.3 |
| 2006/0193734 | A1 | 8/2006 | Martin et al. |

FOREIGN PATENT DOCUMENTS

| | | |
|---|---|---|
| DE | 1807929 | 3/1960 |
| DE | 1225440 | 9/1966 |
| DE | 2210805 | 9/1972 |
| DE | 102004041290 | 8/2004 |
| DE | 102007025202 A1 * | 12/2008 |
| DE | 102008052189 A1 * | 6/2010 |
| EP | 0965376 | 6/1998 |
| EP | 1199093 A1 * | 4/2002 |
| JP | 62003116 A * | 1/1987 |
| WO | WO-2007/085752 | 2/2007 |

* cited by examiner

CHARGING DEVICE

CROSS-REFERENCES TO RELATED APPLICATION

This application claims priority to German patent application DE 10 2007 062 223.8 filed on Dec. 21, 2007, which is hereby incorporated by reference in its entirety.

TECHNICAL FIELD

The present disclosure relates to a charging device, in particular an exhaust-gas turbocharger for a motor vehicle. Furthermore, the disclosure relates to a motor vehicle equipped with such a charging device.

BACKGROUND

Exhaust-gas turbochargers serve in a known manner for increased performance of piston engines by increasing an air flow and fuel flow rate per combustion cycle. Such an exhaust-gas turbocharger causes this by increasing the pressure in the intake tract so that for the combustion, a larger amount of air and hence more oxygen is available for a correspondingly larger amount of fuel. In the exhaust-gas turbocharger itself, a rotatably supported shaft is arranged which carries in a known manner a compressor wheel on the one end, and a turbine wheel on the other end. Due to the shaft's high rotational speeds which can be achieved during the operation of the exhaust-gas turbocharger, the shaft has to be sufficiently lubricated to prevent a quick wear. To be able to ensure the lubricity on a long-term basis, the lubricant used for lubricating the shaft is filtered, wherein even in case of a clogging of the filter, a sufficient lubrication of the shaft has to be ensured to avoid damage.

From U.S. Pat. No. 7,040,874 B1, a charging device of the generic kind is known in which in a lubricant supply channel, a filter element for filtering the lubricant is arranged. Should the filter element be clogged during the operation thereby losing its filtering effect, a plunger-like safety valve is provided which opens and releases a bypass line bypassing the filter element. In this case, the lubricant flows indeed unfiltered to the bearing device, however, it can be avoided that the bearing device is only insufficiently lubricated.

From US 2006/0193734 A1, a further bearing device of the generic kind is known.

SUMMARY

The present invention is concerned with the problem to propose, for a bearing device of the generic kind, an improved and at least different embodiment which, in particular, is characterized by a high operational reliability and a simple design configuration, in particular in the region of a lubricant supply channel.

This problem is solved according to the subject matter of the claims. Advantageous embodiments are discussed in greater detail below.

The invention is based on the general idea to provide, in a lubricant supply channel through which lubricant is supplied to a bearing device for a shaft supported in a housing of a charging device, an adjustable filter element which is pretensioned in the normal state in a first position, and which filters the lubricant to be supplied to the bearing device, while in case of a malfunction, for example due to a clogged filter, it is adjusted in a second position, thereby releasing a bypass which bypasses the filter element. The charging device includes in a known manner a shaft which is supported in a housing, and which carries a turbine wheel on the turbine side, and a compressor wheel on the compressor side. The shaft is supported by the above mentioned bearing device which is supplied with lubricant through the lubricant supply channel. In this lubricant supply channel, the filter device with said filter element is arranged to be able to filter the supplied lubricant in advance. According to the invention, the filter element of the filter device is now pretensioned by means of a spring device against a seal seat so that the lubricant has to flow through the filter element before reaching the bearing device. If, however, the filter element is clogged, for example due to high contamination in the lubricant, and is not able anymore to fully develop its filtering effect, then it is disengaged from the seal seat due to the lubricant pressure building up against the spring force of the spring device, and releases said bypass which bypasses the filter element so that a supply of the bearing device with lubricant, independent from the filtering effect of the filter element, is always ensured. By this fact, in particular the operational reliability of the charging device according to the invention can be increased since damage due to insufficient lubricant supply can be reliably avoided.

Preferably, the bypass is integrated into the supply channel. The filter element, according to this embodiment, is supported adjustable in axial direction so that for the bypass, a separate bypass channel does not have to be provided, but ultimately the lubricant supply channel which already exists can be utilized. For this purpose, the spring device is active in axial direction of the lubricant supply channel as well, and presses typically the filter element against a radial step of the lubricant supply channel, wherein the step represents at the same time the seal seat. By means of the integration of the bypass into the supply channel, a particularly compact and structurally simple solution can be achieved.

In a further advantageous embodiment of the solution according to the invention, the filter element is formed as a ring filter element and is pretensioned in axial direction against a seal seat. Today, such ring filter elements are widely used and can be produced cost efficiently in almost all embodiments or sizes, respectively. Furthermore, the filter element formed in this manner can easily be replaced, whereby maintenance/repair efforts can be reduced.

Preferably, the filter element comprises a seal, in particular a sheet metal, paper, or plastic seal, by means of which the filter element abuts against the seal seat. To avoid in the normal operational state a bypassing of the filter element, it has to be ensured that the filter element abuts tightly against the seal seat and thereby the bypass is closed. To be able to increase the sealing effect between the filter element, on the one hand, and the seal seat, on the other hand, the above described seals can be provided. They can be formed separately or can already be arranged at the filter element, wherein in particular in the latter case, forgetting the seal during maintenance of the filter element can be avoided.

In a further advantageous embodiment of the solution according to the invention, the filter element comprises a cup-shaped, in particular a conical cup-shaped form, and abuts with an axial front side against the seal seat. With a cup-shaped formation of the filter element, an increase of the effective filter area can be obtained and hence an improved filtering effect compared to a ring filter. However, with simply the same filter area, the cup-shape formed filter element could be formed smaller compared to a pure ring filter element, whereby advantages in installation space can be realized.

Further important features and advantages of the invention arise from the sub-claims, the drawings, and the associated description of the figures on the basis of the drawings.

It is to be understood that the features mentioned above, and still to be explained in the following, can be used not only in each of the mentioned combinations, but also in other combinations or on their own without departing from the scope of the present invention.

BRIEF DESCRIPTION OF THE DRAWING

Preferred exemplary embodiments of the invention are illustrated in the drawings, and are explained in the following description in more detail, wherein identical reference numbers relate to identical, or similar, or functionally identical components.

In the figures

DETAILED DESCRIPTION

Figure 1:
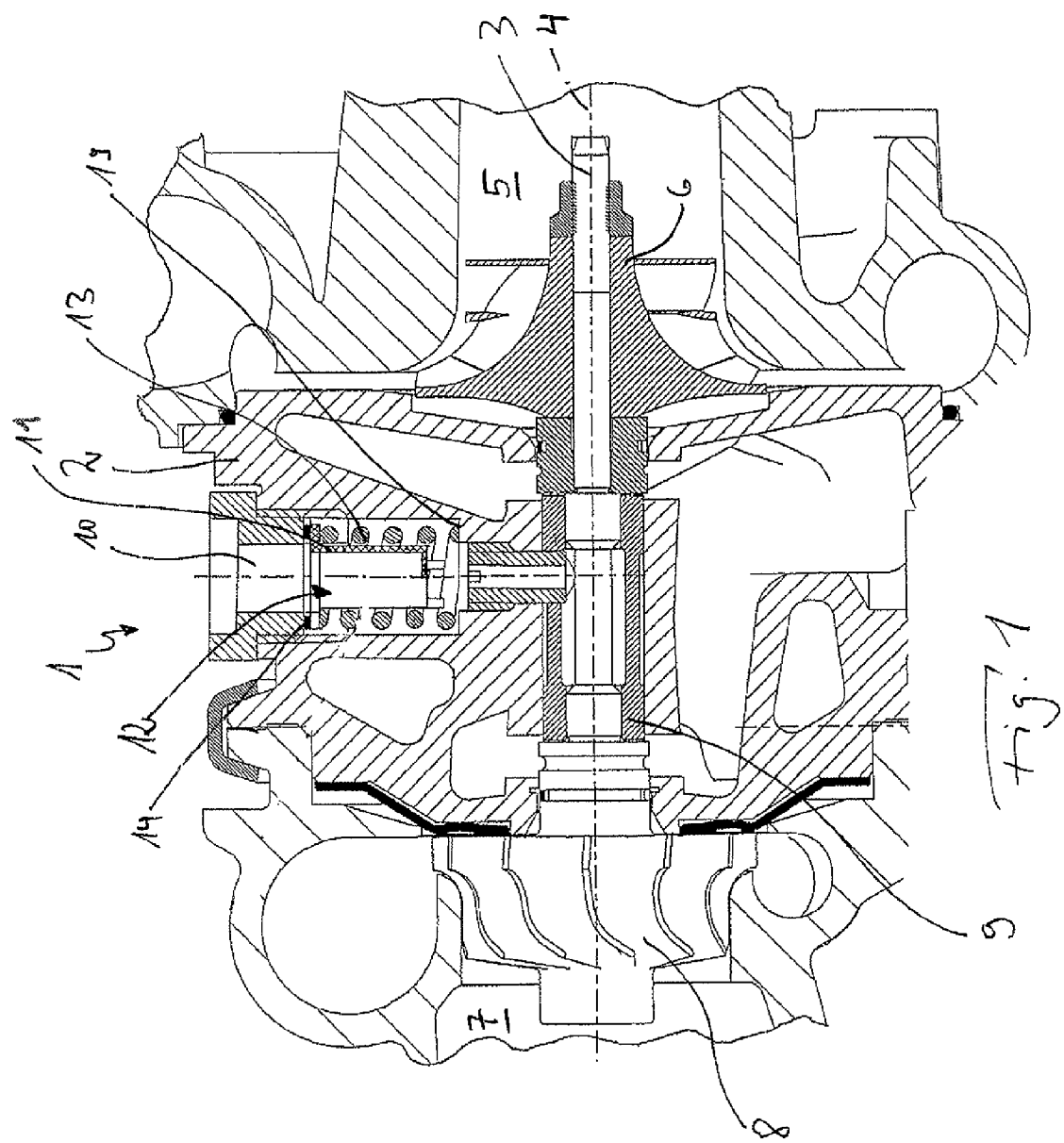
FIG. 1 shows schematically a cross-sectional view of a charging device according to the invention.

According to FIG. 1, a charging device 1 according to the invention, which can be formed in particular as an exhaust-gas turbo charger for a motor vehicle which is not shown here, comprises a housing 2 with a shaft 3 arranged rotatable therein. For this, the shaft 3 is supported rotatable about a rotational axis 4 and carries a turbine wheel 6 on a turbine side 5, and a compressor wheel 8 on a compressor side 7. Here, the turbine wheel 6 is driven by an exhaust gas flow of the internal combustion engine equipped with the charging device 1 according to the invention, wherein the rotational movement is transferred by means of the shaft 3 to the compressor wheel 8 which compresses the air supplied to the combustion in the internal combustion engine. The shaft 3, according to FIG. 1, is supported rotatable in the housing 2 by means of a bearing device 9. For this, the bearing device 9 can be formed, for example, as a hydrodynamic sliding bearing. To ensure a reliable support also at high rotational speeds of the shaft 3 occurring during the operation of the charging device 1, the bearing device 9 has to be lubricated for which a lubricant supply channel 10 is provided, through which the bearing device 9 is supplied with lubricant.

For this purpose, in the lubricant supply channel 10, a filter device 11 with at least one filter element 12 is arranged so that the lubricant supplied to the bearing device 9 can be filtered or cleaned, respectively, in advance. Also arranged in the lubricant supply channel 10 is a spring device 13 which, according to FIG. 1, is formed as a spiral spring, and which pretensions the filter element 12 against a seal seat 14 (cf. also FIG. 2). The spring device 13 and the filter element 12 are formed according to the invention in such a manner that at exceeding a predefined lubricant threshold pressure, which builds up, for example, due to a clogged filter element 12, the filter element 12 disengages from the seal seat 14 and releases a bypass 15 which bypasses the filter element 12 (cf. FIG. 2). In doing so, the spring device 13 is tensioned and remains in this tensioned position until the lubricant pressure has fallen again below the lubricant threshold pressure.

Figure 2:
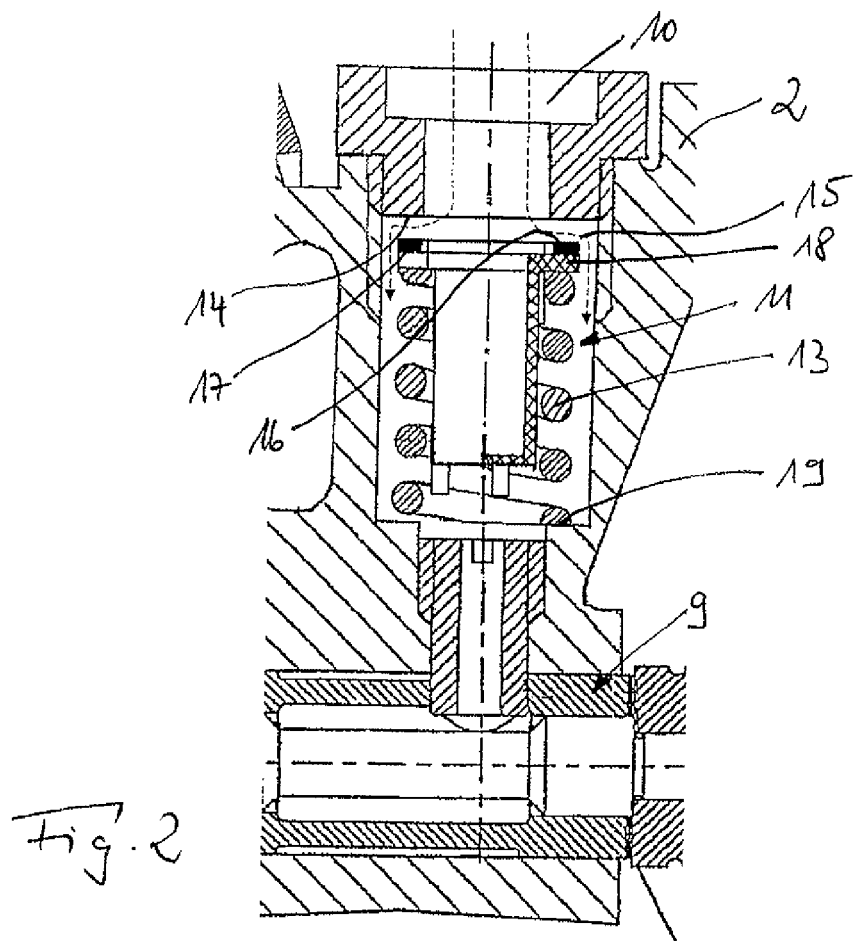
FIG. 2 shows schematically a detail view of a lubricant supply channel of the charging device comprising an adjustable filter element according to the invention.

As FIG. 2 shows, the bypass 15 is integrated here into the lubricant supply channel 10 so that an external bypass channel, which runs outside of the lubricant supply channel 10, can be avoided.

Figure 3:
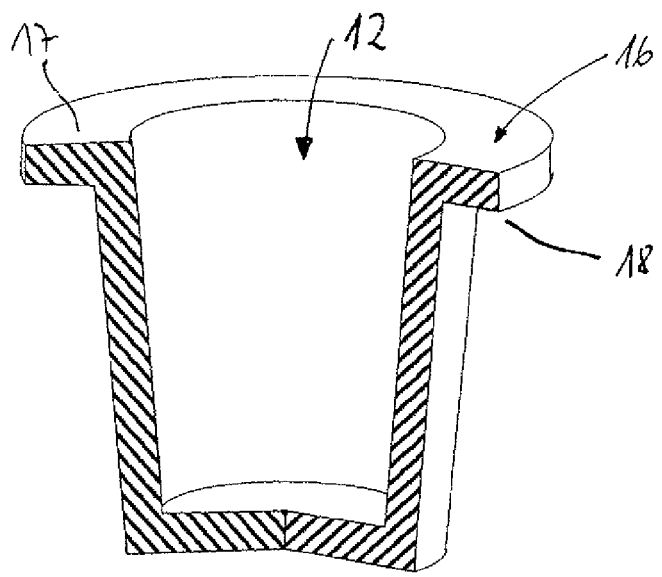
FIG. 3 shows schematically a possible embodiment of a filter element.

Generally, the filter element 12 can be formed as a ring filter element, or can have a cup-shaped, in particular, a conical cup-shaped form as shown, for example, according to FIG. 3, and can abut with an axial front side 16 against the seal seat 14. To increase the sealing effect between the front side 16 of the filter element 12, on the one hand, and the seal seat 14, on the other hand, it can be provided that in this region, a seal 17, in particular a sheet metal, paper, or plastic seal is provided. The same can be formed, for example, integral with, or separate to the filter element 12. As a material for the filter element 12, for example, ceramics, sinter, metal, or plastic can be considered.

Looking at FIG. 2, it is apparent that the spring device 13 is formed as a spiral spring and rests, on the one hand, on a collar 18 of the filter element 12, the collar projecting radially outwards, and, on the other hand, on the housing 2 of the charging device 1, and, in particular, on the radial step 19.

By means of the inventive filter arrangement in the lubricant supply channel 10, in the normal operational state, a reliable filtering, that is, cleaning of the lubricant supplied to the bearing device 9 can be achieved, while in case of a clogged filter element 12, the same disengages from the seal seat 14 and releases the bypass 15. Since the filter element 12 as well as the spring device 13, and the seal seat 14 are arranged in a compact manner in the lubricant supply channel 10, a particularly space-saving design can be achieved, which, in addition, is formed in a structurally very simple manner. A replacement of the filter element 12 as well as a re-assembly of a new filter element 12 is also proven to be simple.

The invention claimed is:

1. A charging device for a motor vehicle, comprising:
   a housing;
   a shaft including a turbine wheel, a compressor wheel, a turbine side and a compressor side, where the shaft is supported in the housing, and which carries the turbine wheel on the turbine side, and the compressor wheel on the compressor side;
   at least one bearing device in the housing, wherein the shaft is supported by the at least one bearing device;
   a lubricant supply channel, wherein the lubricant supply channel is for supplying lubricant to the bearing device,
   a filter device with at least one filter element, the filter element having a collar, wherein in the lubricant supply channel, and the filter device with at least one filter element is arranged,
   a spring device;
   a seal seat;
   wherein the filter element is pretensioned by the spring device against the seal seat,
   wherein the spring device and the filter element are such that at exceeding a certain lubricant threshold pressure, the filter element disengages from the seal seat, and releases a bypass which bypasses the filter element; and
   wherein the spring device rests-on one of the collar, the collar projecting radially outwards, and on the housing of the charging device.

2. The charging device according to claim 1, wherein the bypass is integrated into the lubricant supply channel.

3. The charging device according to claim 2, wherein the filter element is formed as a ring filter element, and is pretensioned in axial direction against the seal seat.

4. The charging device according to claim 2, wherein the spring device comprises a spiral spring.

5. The charging device according to claim 2, wherein the filter element comprises a seal, wherein the seal abuts against the seal seat.

6. The charging device according to claim 5, wherein the seal is one of a sheet metal, paper, and plastic seal.

7. The charging device according to claim 2, wherein the filter element has a cup-shaped form, and abuts with an axial front side against the seal seat.

8. The charging device according to claim 7, wherein the filter element is cup-shaped as one of a conical cup-shaped and a disk-shaped form.

9. The charging device according to claim 2, wherein the filter element is formed from at least one of the following materials:
  i. ceramics,
  ii. sinter,
  iii. metal, and
  iv. plastic.

10. The charging device according to claim 1, wherein the filter element is formed as a ring filter element, and is pretensioned in axial direction against the seal seat.

11. The charging device according to claim 1, wherein the spring device comprises a spiral spring.

12. The charging device according to claim 1, wherein the filter element comprises a seal, wherein the seal abuts against the seal seat.

13. The charging device according to claim 12, wherein the seal is one of a sheet metal, paper, and plastic seal.

14. The charging device according to claim 1, wherein the filter element has a cup-shaped form, and abuts with an axial front side against the seal seat.

15. The charging device according to claim 14, wherein the filter element is cup-shaped as one of a conical cup-shaped and a disk-shaped form.

16. The charging device according to claim 1, wherein the filter element is formed from at least one of the following materials:
  i. ceramics,
  ii. sinter,
  iii. metal, and
  iv. plastic.

17. The charging device according to claim 1, wherein the bearing device is formed as a hydrodynamic sliding bearing.

18. The charging device according to claim 1 wherein the charging device is part of an internal combustion engine of a motor vehicle.

19. A charging device, comprising:
  a housing;
  a shaft including a turbine wheel, a compressor wheel, a turbine side and a compressor side, where the shaft is supported in the housing, and carries the turbine wheel on the turbine side, and the compressor wheel on the compressor side;
  at least one bearing device is configured in the housing, wherein the shaft is supported by the at least one bearing device;
  a lubricant supply channel, wherein the lubricant supply channel is for supplying lubricant to the bearing device,
  a filter device with at least one filter element, the filter element having a collar, wherein the filter device with at least one filter element is arranged in the lubricant supply channel;
  a spring device, wherein the spring device rests-on one of the collar, the collar projecting radially outwards, and on the housing of the charging device; and
  a seal seat;
  wherein the filter element is pretensioned by the spring device against the seal seat,
  wherein the spring device and the filter element are such that at exceeding a certain lubricant threshold pressure, the filter element disengages from the seal seat, and releases a bypass integrated into the lubricant supply channel, the bypass bypasses the filter element.

* * * * *

UNITED STATES PATENT AND TRADEMARK OFFICE
CERTIFICATE OF CORRECTION

| | | |
|---|---|---|
| PATENT NO. | : 8,051,660 B2 | |
| APPLICATION NO. | : 12/338434 | |
| DATED | : November 8, 2011 | |
| INVENTOR(S) | : Rafael Weisz | |

It is certified that error appears in the above-identified patent and that said Letters Patent is hereby corrected as shown below:

On the Title Page:

Item [73] Assignee, change Assignee name from "Mahle International GmbH (DE)" to "Bosch Mahle Turbo Systems GmbH & Co. KG"

Signed and Sealed this
Seventeenth Day of April, 2012

David J. Kappos
*Director of the United States Patent and Trademark Office*